REJECTION OF LINE INTERFERENCE

Filed Nov. 17, 1950 3 Sheets-Sheet 1

COY M. BYERLY,
INVENTOR.

BY Lyon & Lyon

ATTORNEYS.

Aug. 7, 1956 C. M. BYERLY 2,758,299

REJECTION OF LINE INTERFERENCE

Filed Nov. 17, 1950 3 Sheets-Sheet 2

COY M. BYERLY,
INVENTOR.

BY Lyon & Lyon

ATTORNEYS

REJECTION OF LINE INTERFERENCE

Filed Nov. 17, 1950 3 Sheets-Sheet 3

COYMBYERLY,
INVENTOR.

BY Lyon & Lyon

ATTORNEYS

United States Patent Office 2,758,299

Patented Aug. 7, 1956

2,758,299

REJECTION OF LINE INTERFERENCE

Coy M. Byerly, Culver City, Calif., assignor to Gilfillan Bros., Inc., Los Angeles, Calif., a corporation of California Application November 17, 1950, Serial No. 196,310

1 Claim. (Cl. 343—5)

The present invention relates to improved means and technique whereby video signals may be transferred to remotely located stations without substantial interference due to electrostatic or electromagnetic influences exerted by neighboring lines carrying currents of low frequency; for example, 60 cycles; and, specifically, the present invention relates to improved means and technique whereby the video and synchronizing signals in a radar system may be transmitted to a remote location over the same transmission line while preserving the fidelity of the video.

The present invention contemplates an improvement in a ground controlled approach (G. C. A.) radar system in which the echo receiving antenna may, for example, be located adjacent an aircraft landing strip with the associated indicator located at a remote position, as for example, in a control tower which may be located as much as two miles from the antenna itself.

In such systems a part of the echo receiving system is located adjacent the antenna in which the received echoes are detected, and the resulting video is transferred over a transmission line, such as a coaxial cable, to the control tower at which the video is applied to a cathode ray tube to produce visual indications of the video.

Such video is comprised of different frequency components extending, for example, from 60 cycles per second to ten megacycles, and it is desirable that the video be conveyed without appreciable loss in fidelity from the antenna to the remotely located cathode ray tube indicator. One of the chief factors contributing to loss in fidelity in systems of this character results from interfering voltages induced into the connecting lines from neighboring power lines. These voltages, induced either electromagnetically or electrostatically, are, of course, of power frequency and have caused considerable trouble in the past, particularly since these pickup voltages may not remain constant either in amplitude or in "phase."

Heretofore different attempts have been made to overcome the deleterious effects produced by such interfering voltages such as, for example, using a shielded twisted cable pair and low pass filtering networks. Such networks leave much to be desired since they require elaborate design, are bulky, and themselves introduce undesirable time delays, and require adjustment, depending upon the intensity of the voltage induced and its phase. This problem is made more difficult in those instances where the level of these interference voltages exceeds that of the transmitted video signal.

It is therefore an object of the present invention to provide improved means and technique whereby the effect of the interfering voltages of power frequency is minimized, whereby the video may be transferred to a remotely located station without appreciable loss in fidelity.

Specifically, an object of the present invention is to provide means and a teaching whereby the effect of interfering signals of power frequency induced in a long transmission line carrying video frequencies may be minimized.

Another specific object of the present invention is to provide an improved radar system in which both the synchronizing signals and video are transferred over the same transmission line extending to a remotely located indicating station without deleterious effects produced by induction of voltages of power frequency from neighboring power lines.

Another specific object of the present invention is to provide means whereby the low frequency components of the video signal are selectively amplified, or preemphasized, in relationship to the high frequency components thereof, before application to the long transmission line, and in such relationship to the expectant induced voltages of power frequencies from neighboring power lines, to minimize the effect of the induced voltages.

A further specific object of the present invention is to provide improved means and technique whereby the low frequency components of the video signal are selectively amplified or preemphasized before application to the transmission line, and then subsequently deemphasized at the remotely located receiving station, to minimize the effects of induced voltages of power frequency from neighboring power sources or lines.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

Figure 1:
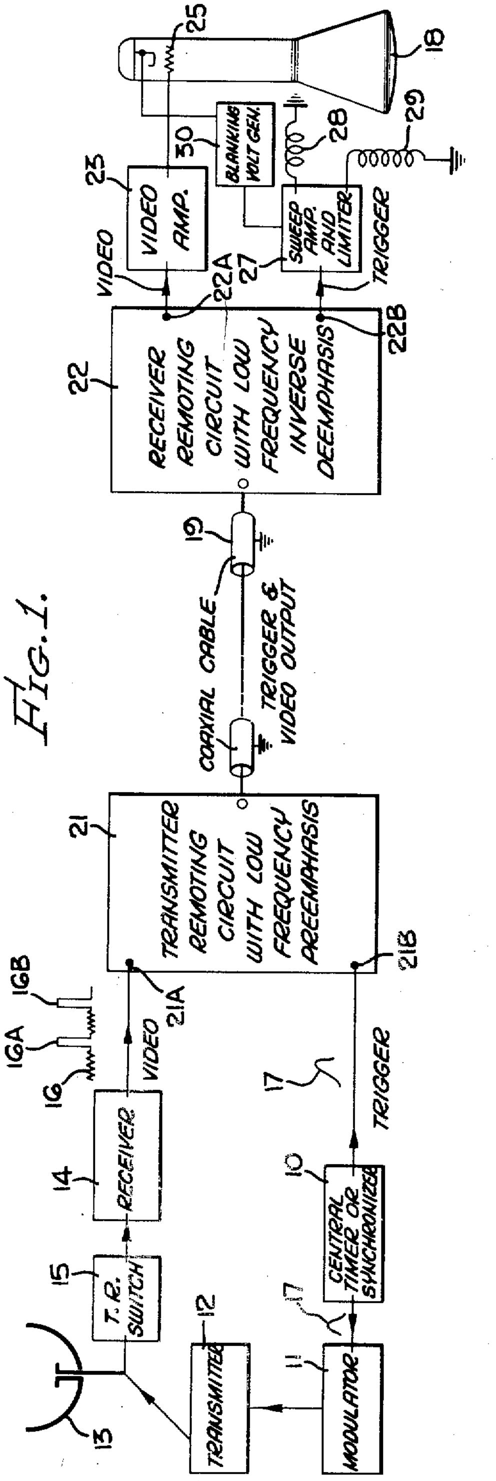
Figure 1 shows in schematic form a portion of a radar system embodying features of the present invention.

Although the present invention in its broader aspects has general utility where it is desired to transmit video or other intelligence over an extended length of transmission line which is subjected to both electromagnetically and electrostatically induced voltages, the present invention is described as being incorporated in a radar system shown in Figure 1.

In Figure 1, the central timer or synchronizer 10 generates pulses or trigger voltages, referred to hereinafter as triggers. These triggers are delivered to the modulator 11, which causes the transmitter 12 to deliver high frequency energy to the antenna system 13 in timed relationship with such triggers. The resulting echoes from reflecting bodies in the path of the electromagnetic beam radiated from the antenna system 13 are received in the receiver 14, which is coupled to the antenna system 13 through the transmit-receive (TR) switch 15. The receiver 14 is of the conventional superheterodyne type and the output of the second detector stage constitutes video represented at 16. This video 16 contains the peaks 16A, 16B, which correspond to the received echoes.

It is desired to transmit this video 16, as well as the synchronizing pulses or triggers 17, to the cathode ray tube indicator 18 to obtain visual representations at a remote location; for example, in the control tower of an airport, with the other components of the radar system previously described located adjacent the aircraft landing strip. These two locations, i. e., the landing strip and control tower, may be separated at a distance of, for example, two miles, and the video 16 and synchronizing pulses 17 are transferred between such stations over the central inner conductor of a single coaxial transmission line 19 which has its outer sheath grounded. For this purpose, the video 16 and synchronizing triggers 17 are applied to the "transmitter remoting circuit with low frequency preemphasis" 21 in Figure 1, this circuit being shown in more detail in Figure 2.

Figure 3:
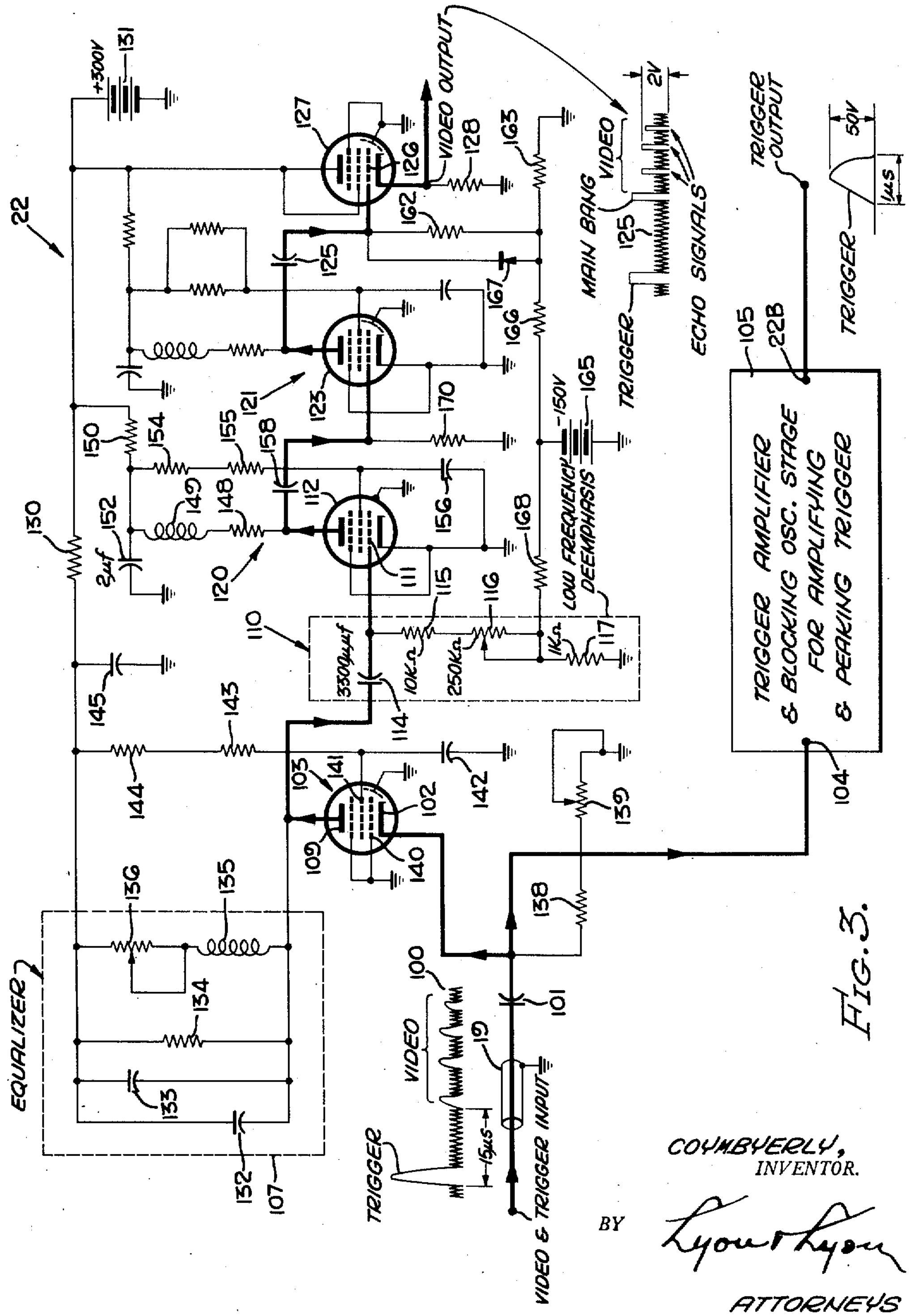
Figure 3 is a circuit diagram showing the circuit components in the "Receiver remoting circuit with low frequency inverse deemphasis" shown in Figure 1.

The remote terminals of the transmission line 19 are connected to the "receiver remoting circuit with low frequency deemphasis" 22, which is shown in detail in Figure 3. One of the output terminals 22A of the remoting circuit 22 is connected to the input terminal of the video amplifier 23, the output of which is connected, in turn, to the control grid 25 of the cathode ray tube 18 to effect intensification of the cathode ray beam in accordance with the echo pulses 16A, 16B. The other output terminal 22B of the remoting circuit 22 is connected to an input terminal of the sweep amplifier and sweep limiter stage 27, to cause cathode ray beam deflecting currents to flow periodically, in timed relationship with the pulses 17, through the quadraturely spaced deflecting coils 28, 29 associated with the tube 18. One of the terminals of the sweep amplifier and sweep limiter stage 27 is connected to the blanking voltage generator stage 30, having its output applied to the cathode of the tube 18 to cause the cathode ray beam to become invisible at predetermined times.

The radar system thus far described is essentially conventional, with the exception of the terminal circuits 21, 22, and for a more detailed description of the components shown in block diagram herein, reference is had to the copending patent application of Tasker et al., Serial No. 776,702, filed September 29, 1947.

Figure 2:
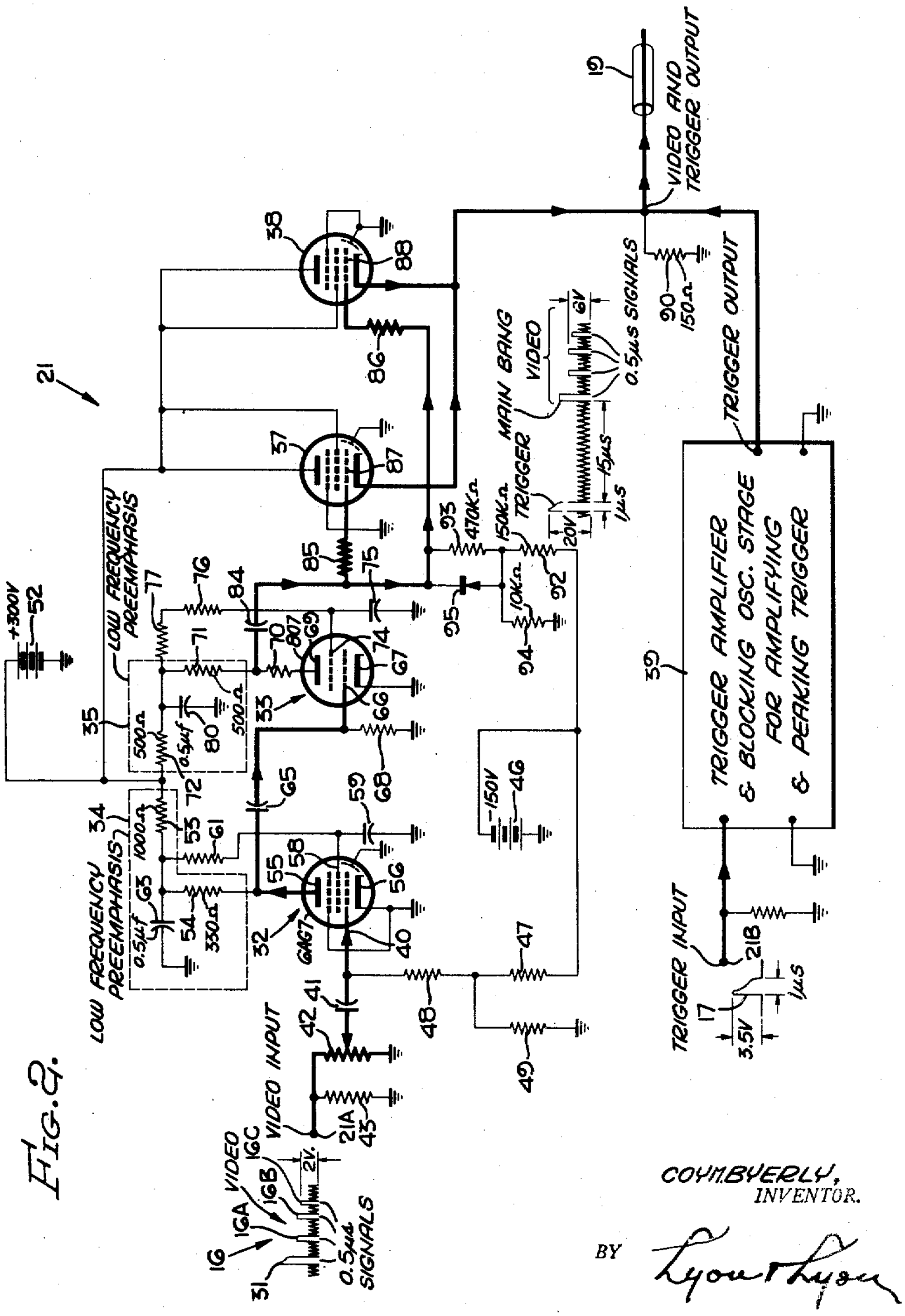
Figure 2 is a circuit diagram showing a portion of the apparatus included in the "Transmitter remoting circuit with low frequency preemphasis" element shown in Figure 1.

Referring to Figure 2, the remoting circuit 21 has the input terminal 21A to which the video 16 is applied. This video includes the echo pulses 16A, 16B, each having a duration of approximately 0.5 microsecond, and the preceding pulse 31 in the video wave 16, which is not an echo pulse, is due to imperfection in the TR switch 15.

The echo pulses of the video 16 comprise, as determined by Fourier analysis, frequency components with appreciable amplitude extending, for example, from 60 cycles per second to 10 megacycles. The first and second amplifier stages 32, 33 in Figure 2 serve to selectively amplify or preemphasize the low frequency components of the video with respect to the high frequency components, to obtain the general results indicated in Figure 4. For this purpose low frequency preemphasis networks 34, 35 are connected in the output circuits of the stages 32, 33. The video signal after thus being selectively amplified in stages 32, 33 is applied to the control grids of the parallel connected cathode follower stages 37, 38, the cathodes of which are each connected to the central conductor of coaxial cable 19. On the other hand, the trigger 17 is applied to the input terminal 21B of the remoting circuit 21. This terminal 21B serves as an input terminal for the trigger amplifier and blocking oscillator stage 39, the output terminal of which is connected to the inner conductor of the coaxial cable 19. The stage 39 is for the purpose of conditioning the synchronizing pulse of trigger 17 for transmission over the line 19, and employs conventional circuitry for amplifying and peaking, i. e., rendering sharper, the synchronizing pulses 17.

For a more detailed description of Figure 2, it is noted that the tube 32 is a pentode and may be a 6AG7 with the control grid 40 connected through condenser 41 to the variable tap on the potentiometer type resistance 42, one outside terminal of which is grounded and the other outside terminal of which is connected to the input terminal 21A. Input resistance 43 is connected in shunt with the potentiometer resistance 42. Bias for the control grid 40 is supplied from the —150 volt source 46, which has one of its terminals grounded and the other one of its terminals connected through resistance 47, 48 to the grid 40; the junction point of resistance 47, 48 being grounded through resistance 49.

Figure 4:
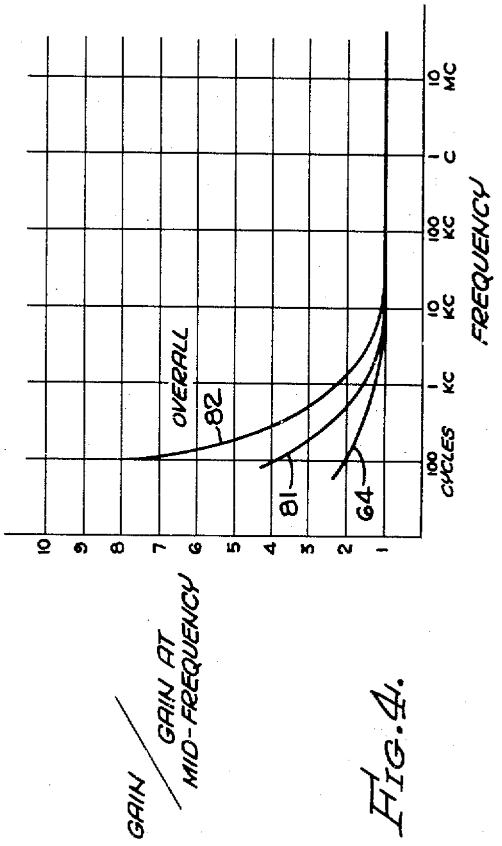
Figure 4 is a graph showing the relationship of gain to frequency in the transmitter remoting circuit shown in Figure 1 and is helpful in describing the operation of Figure 2.

Space current for the device 32 is supplied from the ungrounded positive terminal of voltage source 52, which is connected through resistances 53 and 54 to the anode 55. The cathode 56 is grounded. The screen grid 58 is bypassed to ground through bypass condenser 59 and is connected through resistances 61 and 53 to the positive terminal of source 52. The junction point of resistances 53 and 54 is connected through condenser 63 to ground, so that the resistances 53 and 54 and condenser 63 effect a larger amplification of the low frequency components of video signal than the high frequency components, as indicated in the curve 64 (Figure 4). For this purpose the resistance 53 may be 1,000 ohms, the resistance 54 may be 330 ohms, and the condenser 63 may be 0.5 microfarad.

The frequency components thus selectively amplified in stage 32 and appearing at the anode 55 are applied through coupling condenser 65 to the control grid 66 of stage 33, which may comprise an 807 type tube. The cathode 67 is grounded, and bias for the grid 66 is obtained against the resistance 68 having its ungrounded terminal connected to the grid 66. The anode 69 is connected, for the flow of space current, to the positive terminal of source 52 through the series circuit comprising a small resistance 70, resistance 71 and resistance 72. The screen grid 74 is bypassed to ground through the bypass condenser 75, and connected through resistances 76, 77 and 72 to the positive terminal of source 52. The junction point of resistances 71 and 72 is connected to ground through the condenser 80. Resistances 71 and 72 may each be 500 ohms, condenser 80 may be 0.5 microfarad, and together constitute a low frequency preemphasis circuit functioning in the same manner as the previously described low frequency preemphasis circuit 34 to selectively amplify the low frequency components of the video to obtain the result indicated by the curve 81 in Figure 4.

In Figure 4 the overall effect of the stages 32, 33, represented respectively by the curves 64 and 81, is indicated in curve 82. The abscissae of the curves 64, 81 and 82 each represent frequency and extend over a range of 60 cycles to 10 megacycles, while the ordinates of these curves represent a ratio of gain at the particular frequency concerned to the gain at the frequency midway between 60 cycles and 10 megacycles. It is thus observed from Figure 4, that the frequency components of the video are amplified, i. e., have a higher gain at the low frequencies than at the high frequencies.

The frequency components thus selectively amplified are applied through coupling condenser 84, through resistances 85, 86, to the control grids 87, 88 of the parallel connected cathode follower stages 37, 38. It is noted that one terminal of coupling condenser 84 is connected to the junction point of resistances 70 and 71. The cathodes of stages 37, 38 are each connected to the central conductor of the coaxial cable 19 and are grounded through the output load resistance 90. The screen electrodes and anodes of stages 37, 38 are connected directly to the positive terminal of source 52. Bias for the control grids 87, 88 is obtained from the negative ungrounded terminal of source 46 through the serially connected resistances 92 and 93, the junction point of which is grounded through resistance 94. A germanium crystal 95 is connected in shunt with resistance 93 with polarity indicated, and serves as a clamping diode to prevent blocking of the stages 37, 38, as a result of high positive voltages applied to the grids. The output of the trigger amplifier stage 39 is likewise applied to the ungrounded terminal of the load resistance 90. Thus, a composite signal of video and synchronizing pulses is applied to the inner conductor of cable 19 for transmission to remotely located equipment, shown in detail in Figure 3.

Referring to Figure 3, the composite video and trigger signal 100 appearing on the inner conductor of the coaxial cable 19 is applied through condenser 101, on the one hand, to the cathode 102 of the grounded grid amplifier 103, and, on the other hand, to the input terminal 104 of the "Trigger amplifier and blocking oscillator stage" 105. The signal 100 thus applied to the cathode 102 differs from that at the transmitting circuit 21, in that the amplitudes of all components may be smaller, and attenuation and phase shift in the higher frequency components is greater in relationship to the corresponding attenuation and phase shift appearing in the lower frequency components. In general, the equalizer network 107 introduces a compensatory effect for the attenuation and phase shift of the components of the signal resulting from the characteristics of the coaxial line 19. Also, extraenous signals induced by electrostatic and/or electromagnetic coupling between the elements of the coaxial line 19, and, for example, nearby power lines, form a component of the video signal thus applied to the cathode 102. These induced voltages, at power frequencies, may have an amplitude comparable to that of the echo signals applied at the input terminal to the coaxial cable 19. The signal amplified in tube 103 and appearing at anode 109 is equalized by equalizer stage 107 and applied to the low frequency deemphasis network 110, and more specifically to the control grid 111 of tube 112 through the coupling condenser 114.

The low freqency deemphasis circuit includes generally two components, namely, the circuit, i. e., the input circuit connected at the cable termination which consists of the condenser 101, resistances 138 and 139, and input resistance of the grounded grid amplifier tube 103; and second, the low frequency deemphasis circuit 110. The condenser 101 has a magnitude of two microfarads, and the combined effective resistance value of the resistances 138, 139 and tube 103 is preferably equal to the magnitude of the characteristic impedance of the cable, 75 ohms in this instance. The low frequency deemphasis circuit includes the coupling condenser 114 of, for example, 3300 micromicrofarads, resistance 115 of, for example, 10,000 ohms, a potentiometer resistance 116 of, for example, 250,000 ohms and a resistance 117 of, for example, 1,000 ohms. The condenser 114 is connected between the anode 109 and the control grid 111, and the resistance 115 has one of its terminals connected to the control grid 111 and the other one of its terminals connected to an outside terminal of potentiometer resistance 116. The other outside terminal of potentiometer resistance 116 is connected to the ungrounded terminal of resistance 117, which is likewise connected to the variable tap on potentiometer resistance 116.

In general, adjustment of the resistance 139 results in adjustment of the value of the termination resistance to produce compensatory effects for different tubes which may be used to replace the tube 103. This resistance 139, for a given tube, is adjusted so that the effective resistance of the elements 138, 139 and 103 is 75 ohms, as mentioned above. By thus terminating the cable 19 to a resistance network which has substantially the same resistance as the surge impedance of the cable 19, through the condenser 101, some deemphasis is obtained, particularly when, as in this instance, the condenser 101 has a magnitude of 2 microfarads. The final adjustment, in the nature of a vernier adjustment, is obtained in adjusting the elements of the low frequency deemphasis network 110.

In the particular installation, satisfactory results are obtained when the deemphasis circuit described above attenuates the 60 cycle signals more than the preemphasis circuit in the transmitting circuit 21 boosts that particular frequency. However, this adjustment is not critical and satisfactory results may be obtained over a wide range of adjustment.

The high and low frequency components thus selectively applied to the control grid 111 are amplified in the wide band video amplifier stages 120, 121, which include respectively the discharge devices 112 and 123. The signal after amplification in device 123 is applied through coupling condenser 125 to the control grid 126 of the cathode follower stage 127, and the resulting video appearing across the cathode resistance 128 is applied, as shown in Figure 1, to a video amplifier stage 23 for further amplification to the control grid 25 to effect relative changes in intensity of the cathode ray beam.

On the one hand, the output of the "Trigger amplifier and blocking oscillator stage" 105 is applied to the stage 27 in Figure 1 for achieving the above purposes.

Thus, the transmitted video signals having the general appearance shown at 100 in Figure 3 are transformed into the corresponding composite signal represented at 125. This signal represented at 125 appears across the cathode resistance 128, whereas the signal represented at 100 appears on the cathode 102.

For a more detailed description of Figure 3, it is noted that the equalizer stage 107 has one of its terminals connected to the anode 109 and the other one of its terminals connected through resistance 130 to the positive ungrounded terminal of the voltage source 131. The network 107 includes four shunt connected arms, the first arm including the condenser 132, the second arm including the condenser 133, the third arm comprising the resistance 134, and the fourth arm including an inductance coil 135 and variable resistance 136. The cathode 102 is returned to ground through the serially connected resistance 138 and variable resistance 139, to thereby provide a path for the flow of space current through device 103 and to normally maintain the cathode 102 slightly more positive than the associated ground grid 140.

The screen electrode 141 of device 103 is bypassed to ground through the bypass condenser 142 and supplied with space current through the serially connected resistances 143, 144 and 130. A bypass condenser 145 has its ungrounded terminal connected to the junction point of resistance 130 and 141.

The cathode of the pentode 112 is grounded and the anode of device 112 is connected to the positive terminal of source 131 through the serially connected circuit which includes the resistance 148, peaking coil 149 and resistance 150, the junction point of coil 149 and resistance 150 being connected to the ungrounded terminal of condenser 152. Likewise, the junction point of coil 149 and resistance 150 is connected to the screen electrode of device 112 through the serially connected resistances 154 and 155, such electrode being connected to the ungrounded terminal of bypass condenser 156. It is noted that the wide band amplifier stage 121, which includes the tube 123, is substantially the same as the wide band amplifier stage 120, which includes the tube 112, and for that reason a detailed description of the manner in which the circuit components of stage 121 are interconnected is believed unnecessary.

The amplified signal thus appearing on the anode of device 112 is applied through coupling condenser 158 through the control grid of device 123, the anode of which is coupled through condenser 125 to the control grid 126 of the cathode follower stage. The control grid 126 is returned to ground through the serially connected resistances 162 and 163, the junction point of which is connected to the negative ungrounded terminal of source 165 through the resistance 166. Also, a clamping diode in the form of a germanium crystal 167 may be connected in shunt with the grid resistance 162. Thus, the control grid 126 is maintained slightly negative with respect to its cathode. Source 165 likewise provides a bias potential for the control grid 111 of the wide band amplifier 112. In this respect it is noted that the junction point of resistances 116 and 117 is connected through resistance 168 to the ungrounded negative terminal of source 165, whereas the main control grid for device 121 is grounded through the grid resistance 170.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

I claim:

In a radar system of the character described, wherein it is desired to transmit both video and synchronizing signals from a sending station to a remote receiving station over a transmission line which is subject to interference from neighboring low frequency power lines or sources without substantial interference due to neighboring power circuits, a source of triggers, first means sensitive to said triggers for deriving video echo signals in timed relationship with said triggers, a transmission line substantially free from currents of power frequencies extending from said sending station to said remote receiving station, second means coupling said source of triggers to said transmission line at said sending station, a source of said video echo signals derived in timed relationship with said triggers, low frequency preemphasis means connected between said source and said transmission line at said receiving station, said second coupling means being effective to couple said source of triggers to said line without said triggers being influenced by said pre-emphasis means, video reproducing means, low frequency deemphasis means connected between said video reproducing means and said transmission line at said receiving station, and third means coupled between said video reproducing means and said transmission line at said receiving station for operating said video reproducing means in timer relationship with said triggers said third means being effective to couple said triggers to said video reproducing means without said triggers being influenced by said de-emphasis means.

References Cited in the file of this patent

UNITED STATES PATENTS

| | | |
|---|---|---|
| 2,151,072 | Bedford | Mar. 21, 1939 |
| 2,200,073 | Bedford | May 7, 1940 |
| 2,268,813 | Foster | Jan. 6, 1942 |
| 2,412,669 | Bedford | Dec. 17, 1946 |
| 2,476,690 | Abrahams et al. | July 19, 1949 |
| 2,617,094 | Tinus | Nov. 4, 1952 |